United States Patent
Sugumar (10) Patent No.: US 9,946,327 B2
(45) Date of Patent: Apr. 17, 2018

(54) THERMAL MITIGATION WITH POWER DUTY CYCLE

(71) Applicant: QUALCOMM Incorporated, San Diego, CA (US)

(72) Inventor: Suresh Sugumar, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 14/626,916

(22) Filed: Feb. 19, 2015

(65) Prior Publication Data

US 2016/0246346 A1     Aug. 25, 2016

(51) Int. Cl.
*G06F 1/32*     (2006.01)
*G06F 1/20*     (2006.01)

(52) U.S. Cl.
CPC .............. *G06F 1/324* (2013.01); *G06F 1/206* (2013.01); *G06F 1/3206* (2013.01); *G06F 1/3243* (2013.01); *G06F 1/3287* (2013.01); *G06F 1/3293* (2013.01); *Y02B 60/1217* (2013.01); *Y02B 60/1239* (2013.01); *Y02B 60/1282* (2013.01)

(58) Field of Classification Search
CPC ..... G06F 1/206; G06F 11/002; G06F 11/3058
See application file for complete search history.

(56) References Cited

U.S. PATENT DOCUMENTS

| | | | |
|---|---|---|---|
| 5,590,061 A | 12/1996 | Hollowell, II et al. | |
| 6,714,891 B2 | 3/2004 | Dendinger | |
| 6,823,240 B2 * | 11/2004 | Cooper | G06F 1/206 700/299 |
| 7,263,457 B2 | 8/2007 | White et al. | |
| 7,962,774 B2 | 6/2011 | Chakraborty et al. | |
| 8,214,660 B2 | 7/2012 | Capps, Jr. et al. | |
| 8,924,752 B1 * | 12/2014 | Law | G06F 1/206 713/322 |
| 9,035,956 B1 * | 5/2015 | Schreyer | G06T 1/60 345/502 |
| 9,606,602 B2 * | 3/2017 | Suryanarayanan | G06F 1/3206 |

(Continued)

FOREIGN PATENT DOCUMENTS

WO     2011117671 A1     9/2011

OTHER PUBLICATIONS

International Search Report and Written Opinion—PCT/US2016/013284—ISA/EPO—dated Apr. 20, 2016.

*Primary Examiner* — Dennis M Butler
*Assistant Examiner* — Santosh R Poudel
(74) *Attorney, Agent, or Firm* — Arent Fox LLP (57) ABSTRACT

An apparatus is provided. The apparatus includes a plurality of cores and a temperature sensor configured to monitor a temperature for the cores. The apparatus further includes t least one switch, each being configured to supply power to one of the cores. A thermal mitigation module is configured to operate the at least one switch at a duty cycle based on the monitored temperature. A method for thermal mitigation for an apparatus is provided. The method includes monitoring a temperature for a plurality of cores, supplying power to one of the cores at a duty cycle, and adjusting the duty cycle based on the monitored temperature. Another apparatus is provided. The apparatus includes a plurality of cores, means for monitoring a temperature for the cores, means for supplying power to one of the cores at a duty cycle, and means for adjusting the duty cycle based on the monitored temperature.

21 Claims, 11 Drawing Sheets

(56) References Cited

U.S. PATENT DOCUMENTS

| | | | |
|---|---|---|---|
| 2008/0028244 A1 | 1/2008 | Capps et al. | |
| 2009/0177445 A1* | 7/2009 | Capps, Jr. | G06F 1/206 703/1 |
| 2011/0296212 A1* | 12/2011 | Elnozahy | G06F 1/3203 713/320 |
| 2012/0049933 A1* | 3/2012 | Riechel | G06F 1/206 327/512 |
| 2012/0216064 A1* | 8/2012 | Ko | G06F 1/3206 713/324 |
| 2012/0331321 A1 | 12/2012 | Kaburlasos et al. | |
| 2013/0019120 A1* | 1/2013 | Salsbery | G06F 1/203 713/500 |
| 2013/0060555 A1* | 3/2013 | Thomson | G06F 1/3203 703/21 |
| 2013/0124890 A1* | 5/2013 | Priel | G06F 1/3234 713/320 |
| 2013/0159755 A1* | 6/2013 | Presant | G06F 1/206 713/340 |
| 2014/0189378 A1* | 7/2014 | Hermerding, II | G06F 1/3234 713/300 |
| 2014/0265929 A1* | 9/2014 | Gossehelweg | G05F 1/10 315/307 |
| 2015/0058650 A1* | 2/2015 | Varma | G06F 1/3293 713/324 |
| 2016/0098275 A1* | 4/2016 | Xie | G06F 8/4432 712/215 |
| 2016/0147275 A1* | 5/2016 | Weissmann | G06F 1/3228 713/322 |
| 2016/0147280 A1* | 5/2016 | Thomas | G06F 1/3243 713/320 |
| 2016/0147291 A1* | 5/2016 | Thomas | G06F 1/3296 713/320 |

\* cited by examiner

THERMAL MITIGATION WITH POWER DUTY CYCLE

BACKGROUND

Field

The disclosure relates generally to electronic circuits, in particular, to apparatuses and methods for thermal mitigation.

Background

Increasingly, thermal management is becoming an issue in operating integrated circuits (ICs). For example, wireless communication technologies and devices (e.g., cellular phones, tablets, laptops, etc.) have grown in popularity and use over the past several years. These electronic apparatuses have grown in complexity and now commonly include multiple processors (e.g., baseband processor and application processor) and other resources that allow the users to execute complex and power intensive software applications (e.g., music players, web browsers, video streaming applications, etc.). To meet the increasing performance demand, these processors have increased in complexity and operate in frequencies in the gigahertz range. As a result, substantial heat may be produced while operating these processors.

The heat generated by the processors may adversely affect the performance and the reliability of the device. For example, the performance and reliability of an IC degrade when operating at high temperatures. Moreover, the heat generated by the wireless communication devices must be within a limit tolerated by the users. Thus, one design challenge is providing the thermal mitigation functions to manage the heat issue.

SUMMARY

Aspects of a method for thermal mitigation for an apparatus are provided. The method includes monitoring a temperature for a plurality of cores, supplying power to one of the cores at a duty cycle, and adjusting the duty cycle based on the monitored temperature.

Aspects of an apparatus are disclosed. The apparatus includes a plurality of cores and a temperature sensor configured to monitor a temperature for the cores. The apparatus further includes t least one switch, each being configured to supply power to one of the cores. A thermal mitigation module is configured to operate the at least one switch at a duty cycle based on the monitored temperature.

Aspects of another apparatus are provided. The apparatus includes a plurality of cores, means for monitoring a temperature for the cores, means for supplying power to one of the cores at a duty cycle, and means for adjusting the duty cycle based on the monitored temperature.

It is understood that other aspects of apparatus and methods will become readily apparent to those skilled in the art from the following detailed description, wherein various aspects of apparatus and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The term "apparatus" shall be construed to include any integrated circuit or system, or any portion of an integrated circuit or system (e.g., modules, components, circuits, or the like residing in an integrated circuit or part of an integrated circuit). The term "apparatus" shall also be construed to include any intermediate product where an integrated circuit or system is combined with other integrated circuits or systems (e.g., a video card, a motherboard, etc.) or any end product (e.g., mobile phone, personal digital assistant (PDA), desktop computer, laptop computer, palm-sized computer, tablet computer, work station, game console, media player, computer based simulators, or the like). The term "method" shall similarly be construed to include the operation of any integrated circuit or system, or any portion of an integrated circuit or system, or any intermediate product or end product, or any step, process, algorithm, or the like, or any combination thereof performed by such integrated circuit or system (or portion thereof), intermediate product, or end product.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus or method does not require that all embodiments of the invention include the described components, structure, features, functionality, processes, advantages, benefits, or modes of operation.

The terms "connected," "coupled," or any variant thereof, mean any connection or coupling, either direct or indirect, between two or more elements, and can encompass the presence of one or more intermediate elements between two elements that are "connected" or "coupled" together. The coupling or connection between the elements can be physical, logical, or a combination thereof. As used herein, two elements can be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. A reference to a signal may be referred to the underlying signal line (e.g., a metal line on an IC) carrying the signal. A reference to a resistor may likewise be used to refer to the resistance of said resistor.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of the stated features, integers, steps, operations, elements, and/or components, but do not preclude the presence or addition of one or more other features, integers, steps, operations, elements, components, and/or groups thereof.

Various aspects of apparatuses and methods for thermal mitigation will be presented with respect to a processor for wireless communication and/or a wireless communication system incorporating the processor. However, as those skilled in the art will readily appreciate, the various aspects of thermal mitigation presented throughout this disclosure and their numerous applications are not limited thereto. For example, the aspects presented may be applicable to other ICs besides a processor and applicable to functions beyond wireless communication. Accordingly, all references to a specific application for the presented apparatus or method are intended only to illustrate exemplary aspects of the apparatus or method with the understanding that such aspects may have a wide differential of applications.

Figure 1:
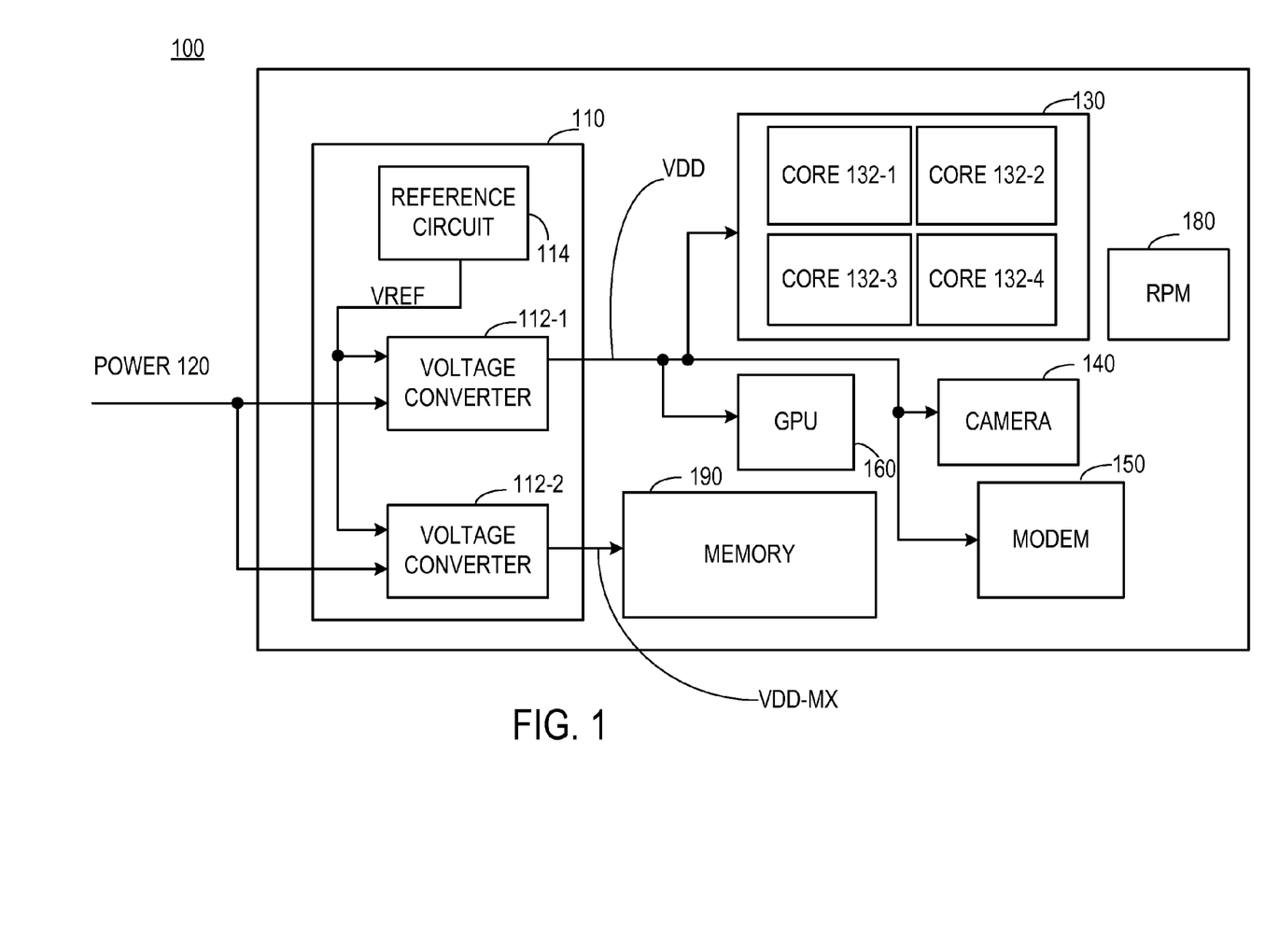
FIG. 1 is a block diagram of an exemplary embodiment of a power supply system for a wireless communication device.

FIG. 1 is a block diagram of an exemplary embodiment of a power supply system for a wireless communication device 100. The wireless communication device 100 includes a power management IC (PMIC) 110 receiving power 120 from, for example, a battery. The PMIC 110 includes a reference circuit 114 configured to generate a reference voltage VREF. The reference circuit 114 may be based on known schemes in the art, such as a bandgap reference voltage generator. The reference voltage VREF is provided to voltage converters 112-1 and 112-2 for generating voltage supply VDD and voltage supply VDD-MX, respectively. The voltage converters 112-1 and 112-2 may be, for example, buck converters. The voltage supplies VDD and VDD-MX are provided to the subsystems of the wireless communication device 100 as to power the operations thereof.

In an exemplary embodiment, the wireless communication device 100 further includes a memory 190 and various subsystems such as a processor 130, a camera unit 140, a modem 150, and a graphic processor unit (GPU) 160. In one configuration, the memory 190 may be a collection of various memory systems for the wireless communication device 100 and receives the voltage supply VDD-MX as a power supply for operations.

The processor 130 may be, for example, an application processor for a wireless communication device. The processor 130 may include cores (132-1-132-4). In one example, a core may be a collection of circuit. In another example, a core may be a processor core or a central processing unit (CPU). These subsystems (e.g., the processor 130, the camera unit 140, the modem 150, and the graphic processor unit (GPU) 160) may be on one or several substrates and may be within one or several packaged ICs.

In an exemplary embodiment, the various subsystems (excluding the memory 190) receive the same voltage supply VDD for operations. Thus, the processor 130, the camera unit 140, the modem 150, and the GPU 160 all receive the voltage supply VDD from the voltage converter 112-1. By combining the (potentially) multiple power rails for the subsystems into a single power rail (the voltage supply VDD), certain cost saving may be achieved. For example, only a single voltage converter (e.g., 112-1) is needed to supply power to the various subsystems. Moreover, traces on the board for the additional power rails may be reduced.

In an exemplary embodiment, the wireless communication device 100 includes a resource power manager (RPM) 180. The RPM module and the modules presented below may include circuits, processor or processors, software executing on the processor or processors, or combinations thereof. These modules may include circuits for generating the signals for the functions described infra or signal lines carrying those signals. These modules may be part of processor 130 or external to the processor 130. Likewise, these modules may be part of the wireless communication device 100 or external to the wireless communication device 100. In one example, theses modules may include instructions executed by one of the cores 132-1-132-4 of the processor 130.

By way of example, a module, or any portion of a module, or any combination of modules may be implemented with one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In an exemplary embodiment, the RPM 180 receives all the voltage selections from the subsystems on the power rail of the voltage supply VDD and selects a maximum VDD for these subsystems. The processor 130, the camera unit 140, the modem 150, and the GPU 160 all receive the same VDD. In one example, the modem 150 may select a high VDD for performance needs (e.g., operating Long Term Evolution Category 4 with carrier aggregation), and all the other subsystems (the processor 130, the camera unit 140, and the GPU 160) may operate at the same higher VDD as the modem 150. For example, the operation voltage (e.g., VDD) of the processor 130 IC may be determined based on an operation voltage of the modem IC, even if the operations of the processor 130 IC do not require the level of the voltage VDD. In this example, the operation voltage VDD is not tailored for the processor 130. The higher than needed voltage VDD supplied to the processor 130 may lead to a higher leakage current, which in turn increases the temperature. Lowering the operation voltage VDD for thermal mitigation may not be available to the processor 130 because of the shared power rail of the voltage supply VDD. In such cases, the wireless communication device 100 risks reaching a runaway temperature (e.g., a temperature of the processor 130 may not be mitigated by means other than power-collapsing the subsystems).

Figure 2:
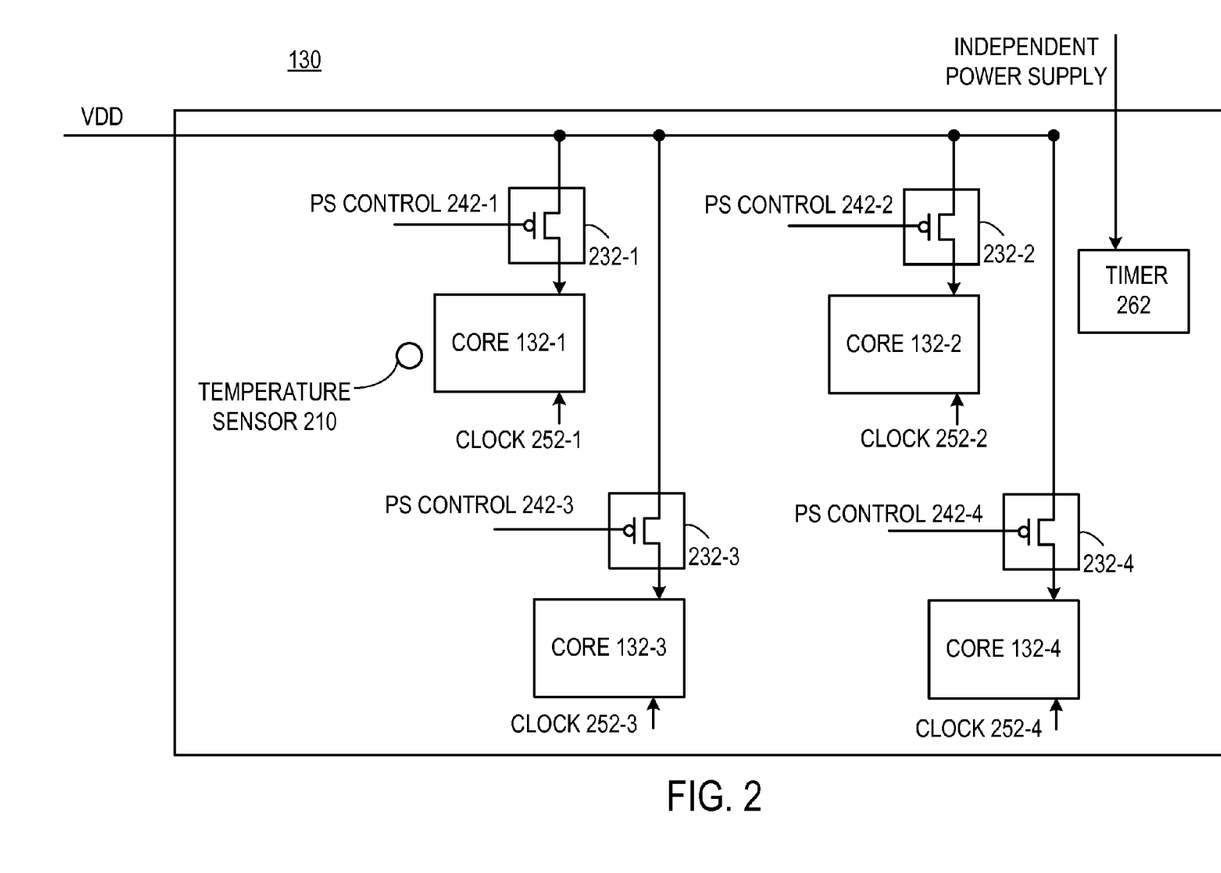
FIG. 2 is a schematic diagram of an exemplary embodiment of a processor implementing the thermal mitigation functions.

FIG. 2 is a schematic diagram of an exemplary embodiment of a processor implementing the thermal mitigation functions. The processor 130 includes cores (e.g., CPUs) 132-1-132-4. Each of the cores 132-1-132-4 receives power from the voltage supply VDD via a power switch (232-1-232-4). As will be described in greater detail later, the power switch provides a means for supplying power to one of the cores at a duty cycle. The power switches 232-1-232-4 are illustrated P-type transistors as examples and are not limited thereto.

Each of the power switches 232-1-232-4 is controlled by corresponding signals PS CONTROL 242-1-242-4. As will be described in greater detail later, the signals PS CONTROL 242-1-242-4 may be generated by a thermal mitigation module 400 (see FIG. 4). The thermal mitigation module may reside in one of the cores 132-1-132-4, be distributed across multiple cores, or reside external to the processor 130, either in whole or part. Each of the signals PS CONTROL 242-1-242-4 operates to control the corresponding one of the power switches 232-1-232-4 to couple power (e.g., the voltage supply VDD) to the corresponding core or to remove power from the corresponding core (e.g., the corresponding one of the cores 132-1-132-4). In an exemplary embodiment, each of the power switches 232-1-232-4 is configured to supply power to a corresponding one of the cores 132-1-132-4 independently by generating the signals PS CONTROL 242-1-242-4 independently.

The cores 132-1-132-4 operate respectively on clocks 252-1-252-4. The clocks 252-1-252-4 may control the operating frequencies of the cores 132-1-132-4. As will be described in greater detail later, the clocks 252-1-252-4 may be generated by the thermal mitigation module 400 (see FIG. 4) and varied or adjusted to adjust the operating frequencies of the cores 132-1-132-4. The processor 130 may further include temperature sensors such as the temperature sensor 210 (only one temperature sensor is shown for clarity). The temperature sensor provides a means for monitoring the temperature for the cores (e.g., the operating temperature) by outputting a sensed on-die temperature. For example, supplying power to the cores 132-1-132-4 may increase the on-die temperature sensed and outputted by the temperature sensor 210.

Moreover, the processor 130 may further include a timer 262. Only one timer is shown for clarity, but it is understood that the processor 130 may include multiple timers. For example, the processor 130 may include one timer for each of the cores 132-1-132-4. The timer 262 receives power from an independent power supply. Thus, the timer 262 receives its power independent of the power switches 232-1-232-4.

Figure 3:
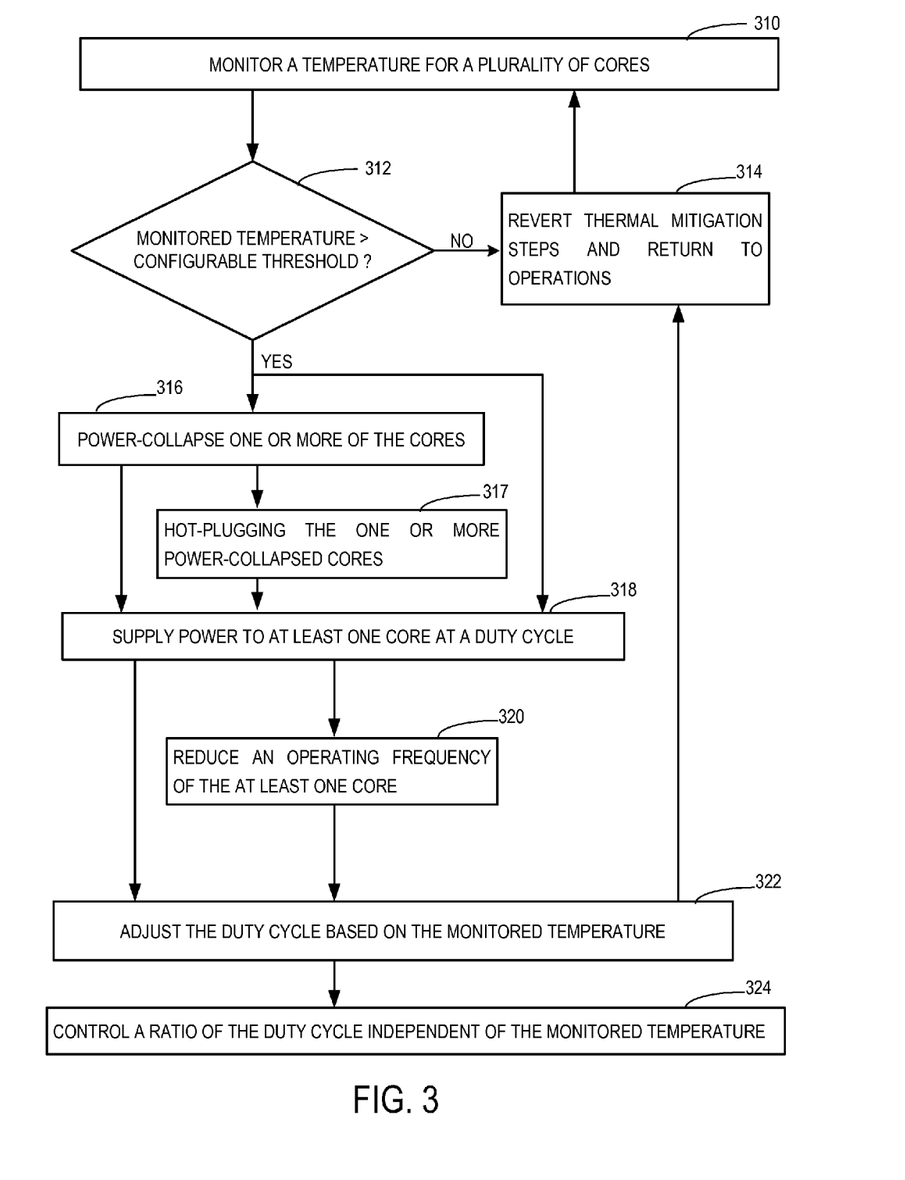
FIG. 3 is a flow diagram illustrating the operation of an exemplary embodiment of a wireless communication device performing the thermal mitigation functions.
Figure 4:
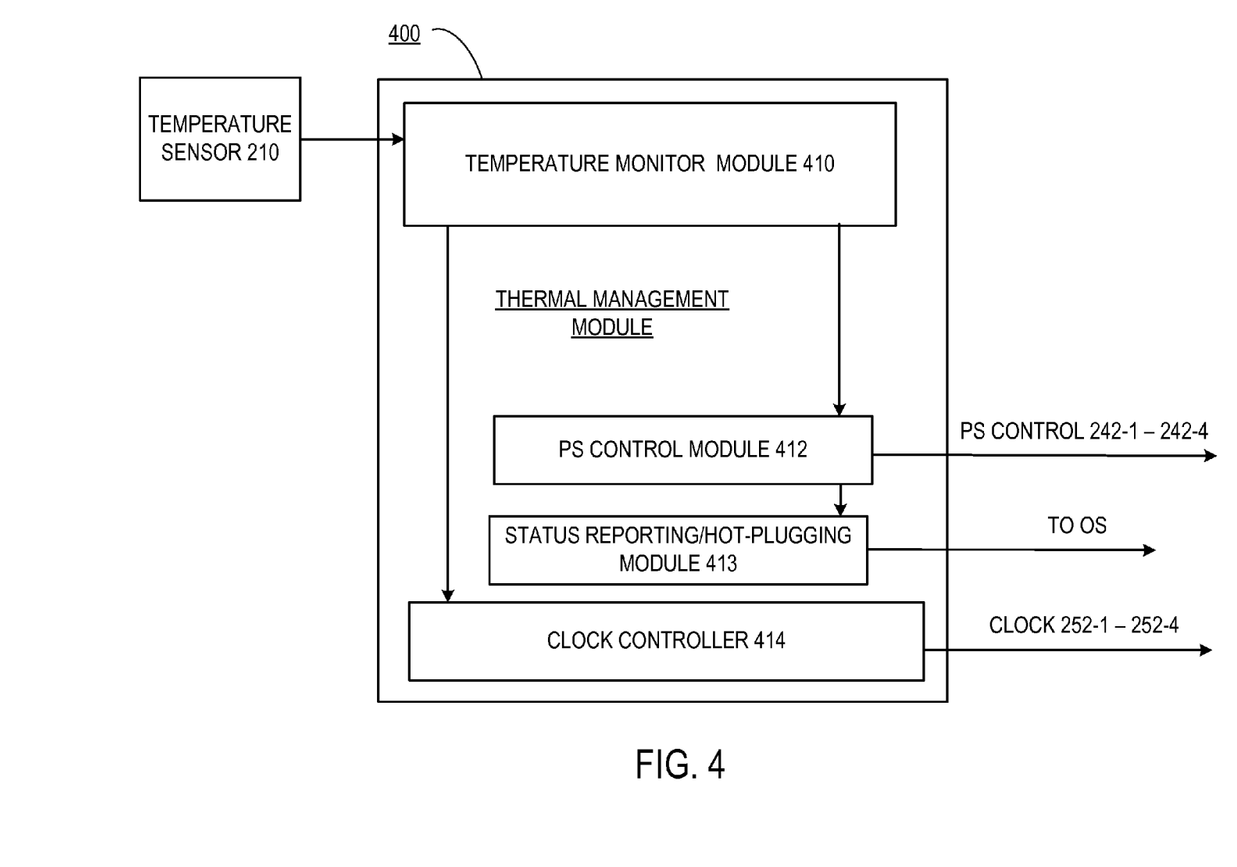
FIG. 4 is a block diagram of an exemplary embodiment of a thermal mitigation module.

FIG. 3 is a flow diagram illustrating the operation of an exemplary embodiment of a wireless communication device 100 performing the thermal mitigation functions. The steps may be performed by a thermal mitigation module 400 as part of the wireless communication device 100 or the processor 130. FIG. 4 is a block diagram of an exemplary embodiment of a thermal mitigation module 400. As described earlier, the thermal mitigation module 400 may be part of processor 130 or external to the processor 130, either in whole or part. To the extent that the thermal mitigation module, or any portion thereof, is implemented external to the processor, it may be implemented in any part of the wireless communication device 100 or external to the wireless communication device 100. In one example, theses modules may include instructions executed by one of the cores 132-1-132-4 of the processor 130.

The thermal mitigation module 400 includes a temperature monitor module 410 which processes the output of the temperature sensor 210 (which, as described above, may be based on operations of the cores 132-1-132-4). The thermal mitigation module 400 further includes the PS control module 412, which provides a means for adjusting the duty cycle of one or more switches based on the monitored temperature. In this exemplary embodiment, the PS control module 412 may determine the power provided to the cores 132-1-132-4 by configuring the power switches 232-1-232-4.

The PS control module 412 generates the signals PS CONTROL 242-1-242-4. In an exemplary embodiment, the PS control module 412 generates the signals PS CONTROL 242-1-242-4 (thereby controls the power supplied to the cores 132-1-132-4) based on the monitored temperature provided by the temperature monitor module 410. In the exemplary embodiment, the PS control module 412 may power-collapse any of the cores 132-1-132-4 via the signals PS CONTROL 242-1-242-2. The status reporting/hot-plugging module 413 provides a means to hot-plug the power-collapsed cores. Hot-plugging is a scheme known in the art for notifying the operating system (OS) to not schedule the power-collapsed cores, so that the OS cannot schedule tasks for the power-collapsed cores. The status reporting/hot-plugging module 413 may notify the OS of the power-collapsed core to effect the hot-plugging.

The thermal mitigation module 400 further includes the clock controller 414, which generate the clocks 252-1-252-4. The clock controller 414 provides the means for reducing operating frequencies of the cores 132-14-132-4 in response to the monitored temperature exceeding a threshold. Such threshold may be configuration by various means, such as by software as is known in the art.

Referring to FIG. 3, at 310, the temperature of the cores is monitored. The temperature may be monitored by the temperature sensor 210 described above or by some other suitable means. At 312, whether the temperature sensor output exceeds a configurable threshold is determined. For example, the temperature monitor module 410 may determine whether the temperature sensor 210 outputs a temperature value exceeding a threshold (e.g., 90° C.) and may provide the determination to the PS control module 412 and the clock controller 414. The threshold may be configurable by, for example, software as is known in the art. In a case that 312 determines that the temperature sensor output does not exceed the configurable threshold, the flow goes to 314. At 314, the thermal mitigation steps are reverted, and regular operations are returned. For example, the PS control module 412 and the clock controller 414 may undo the thermal mitigation steps (e.g., steps 316, 318, 320, and 322 presented below). The wireless communication device 100 or the processor 130 may return to operations without the thermal mitigation steps.

In a case that 312 determines that the temperature sensor output does exceed a (configurable) threshold, the flow goes to 316. At 316, one or more of the cores may be power-collapsed. In an exemplary embodiment, all but one of the cores 132-1-132-4 may be power-collapsed. For example, the PS control module 412 may generate the signals PS CONTROL 242-2-242-4 to respectively control the power switches 232-2-232-4 and to power-collapse the cores 132-2-132-4. In this example, in response to the signals PS CONTROL 242-2-242-4, the power switches 232-2-232-4 may be turned off to remove power from the cores 132-2-132-4. At 317, the power-collapsed one or more cores may be hot-plugged. In an exemplary embodiment, the status reporting/hot-plugging module 413 may effect the hot-plugging of the power-collapsed cores by reporting and identifying the power-collapsed cores to the OS. In the fashion described above, all cores other than the last core 132-1 may be configured to power-collapse (e.g., the time period D in FIG. 6) in response to the output of the temperature sensor 210 exceeding a (configurable) threshold.

At 318, power is supplied to at least one core at a duty cycle. For example, the PS control module 412 may generate the signals PS CONTROL 242-1 to alternately turn on and turn off the power switch 232-1. The power switch 232-1 thus operates at a duty cycle to adjust the power applied to the core 132-1. In one example, a duty cycle is a ratio of the power switch 232-1 being on verses a time period of the power switch 232-1 being on and being off (see FIG. 6 and the accompanying text below). The higher the on-ratio of the duty cycle, the higher the power applied to the core 132-1. Conversely, the lower the on-ratio of the duty cycle, the lower the power applied to the core 132-1. In this fashion, the power switch 232-1 (or multiple power switches) is configured to initiate operating at the duty cycle in response to the temperature sensor output exceeding a (configurable) threshold.

At 320, an operating frequency of the at least one core may be reduced. For example, the clock controller 414 may generate the clock 252-1 to lower the operating frequency of the last remaining operating core 132-1. The regular operating frequency may be in the range of gigahertz. In one example, the clock controller 414 may generate the clock 252-1 to reduce the operating frequency of the core 132-1 to 300 megahertz. In this fashion, the operating frequency of the core 132-1 (or operating frequencies of multiple cores) is reduced in response to the temperature sensor output exceeding a (configurable) threshold.

At 322, the duty cycle may be adjusted based on the monitored temperature. For example, the PS control module 412 may generate the signal PS CONTROL 242-1 to further adjust the duty cycle (e.g., control the ratio of the duty cycle) of the power being supplied to the core 132-1 based on the output of the temperature sensor 210. Further details of this feature are presented below. At 324, a ratio of the duty cycle may be controlled independent of the monitored temperature. For example, the PS control module 412 may control the ratio of the duty cycle without basing such control on the monitored temperature (e.g., without utilizing a temperature-based interrupt).

Figure 5:
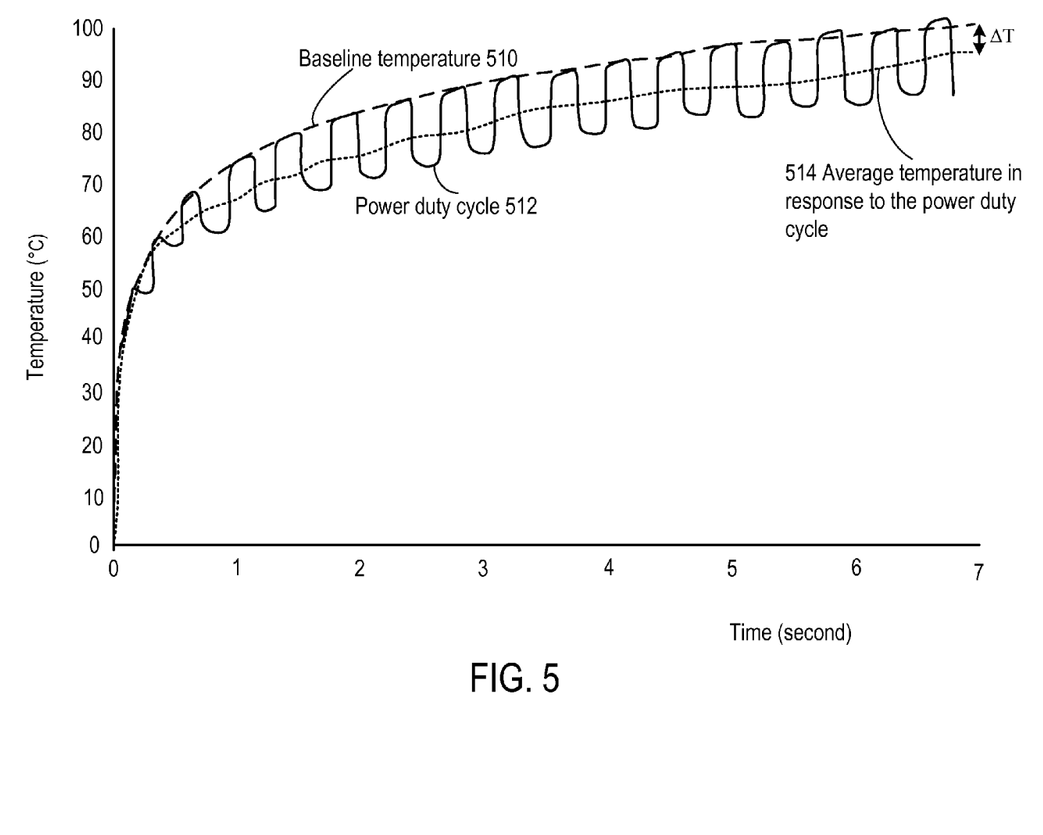
FIG. 5 is a timing diagram illustrating the operation of an exemplary embodiment of thermal mitigation by providing power to a core at a duty cycle.

FIG. 5 is a timing diagram illustrating the operation of an exemplary embodiment of thermal mitigation by providing power to a core at a duty cycle. The X-axis is time (in second), and the Y-axis is temperature (in ° C.). The baseline temperature 510 is, for example, the temperature of the last core 132-1 operating at 300 megahertz with power being supplied constantly (i.e., the power is not removed from the core 132-1). The baseline temperature 510 reaches near 100° C. in about 7 seconds and continues to rise. In comparison, the curve 512 is the power duty cycle of an exemplary embodiment, which provides power to the last core 132-1 at about 50% duty cycle at 500 megahertz. The curve 514 is the average temperature of the last core 132-1 as the result of the power duty cycle (512). A reduction in temperature ΔT from the baseline temperature 510 is produced from the power duty cycle 512.

Figure 6:
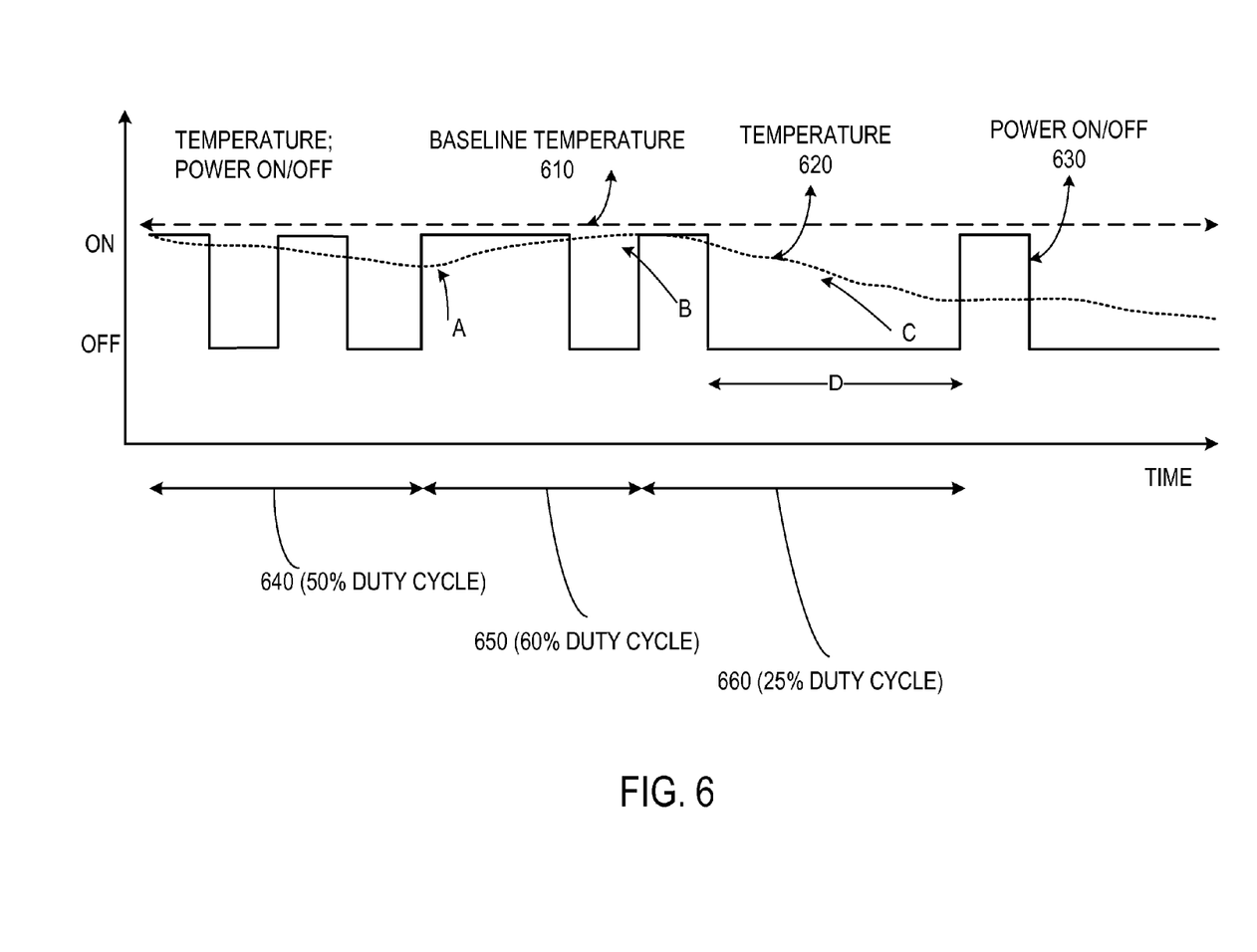
FIG. 6 is a timing diagram of illustrating the operation of an exemplary embodiment of a temperature response of adjusting the power duty cycle based on the output of the temperature sensor.

FIG. 6 is a timing diagram of illustrating the operation of an exemplary embodiment of a temperature response of adjusting the power duty cycle based on the output of the temperature sensor 210. The baseline temperature 610 may be the temperature of the last core 132-1 without the thermal mitigation measures of steps 320 and 322. The power on/off 630 illustrates the duty cycle of the power being supplied to the core 132-1. For example, the power on/off 630 corresponds to the signal PS CONTROL 242-1 being turned on and off. The temperature 620 is the temperature output of the temperature sensor 210, and may correspond to the on-die temperature of the core 132-1.

In the time period 640, the power is supplied to the core 132-1 at a duty cycle of 50% (e.g., the ratio of the duty cycle is 50%). Thus, the power on period equals to the power off period. As a response, the temperature 620 drops (point A). In the time period 650, the PS control module 412 may, based on the output of the temperature sensor 210, adjust or increase the duty cycle of the power switch 232-1 to 60% (e.g., the power switch 232-1 being on is 60% of the total period of the power switch 232-1 being on and off). This adjustment allows for more operations to be performed by the core 132-1. As a result, temperature 620 starts to rise (point B). In the time period 660, the PS control module 412 may, based on the output of the temperature sensor 210, adjust or reduce the duty cycle of the power switch 232-1 to 20% (e.g., the power switch 232-1 being on is 25% of the total period of the power switch 232-1 being on and off). This adjustment reduces the operations performed by the core 132-1 but also reduces the temperature 620 (point C).

In an exemplary embodiment, the time period D is a time period in which all the cores 132-1-132-4 are power-collapsed. No power is provided to the cores 132-2-132-4, which are in a constant power-collapsed state. Power is provided to the core 132-1 at a duty cycle, and when the power is removed, the core 132-1 is likewise in the power-collapsed state (time period D).

Figure 7:
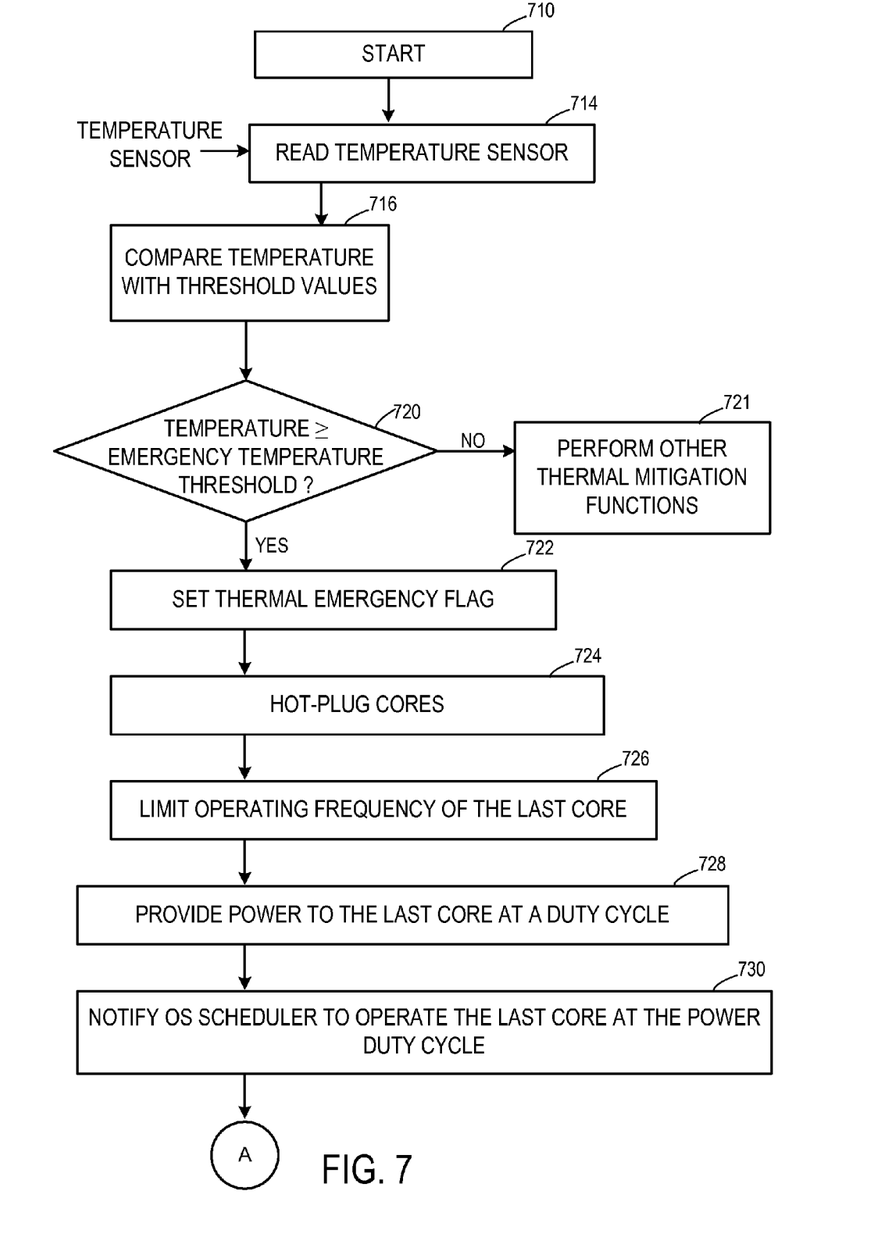
FIG. 7 is a flow diagram illustrating the operation of an exemplary embodiment of a thermal mitigation module initiating the power duty cycle.

FIG. 7 is a flow diagram illustrating the operation of an exemplary embodiment of a thermal mitigation module 400 initiating the power duty cycle. At 710, the thermal mitigation module 400 initiates the thermal mitigation functions, for example, in response to notification from the OS. An example of the OS may be a high-level OS (HLOS) running on the wireless communication device 100. In one example, the OS may be operating on one of the cores 132-1-132-4 on the processor 130 or another processing element in the wireless communication device 100. At 714, the thermal mitigation module 400 reads from temperature sensor(s)

such as the temperature sensor 210. At 716, the thermal mitigation module 400 compares the outputs of the temperature sensor with the temperature thresholds. The thermal mitigation module 400 may perform various thermal mitigation functions based on the different temperature thresholds. For example, the temperature thresholds may include an emergency temperature threshold. In an exemplary embodiment, the emergency temperature threshold may be near a runaway temperature at which the temperature of the processor 130 may not be mitigated by means other than power-collapsing the cores. In one example, the emergency temperature threshold may be 90° C. In another example, the emergency threshold may be configuration by various means, such as by software as is known in the art.

At 720, the thermal mitigation module 400 determines whether the outputs of the temperature sensor are greater or equal to the emergency temperature threshold. If the determination is negative, at 721, the thermal mitigation module 400 may perform other thermal mitigation functions to address the temperature issue. For example, the other thermal mitigation functions may include reducing the operating frequencies or voltages of the processor 130. If the determination of 720 is in the affirmative, the thermal mitigation module 400 may set a thermal emergency flag (722). An example of the thermal emergency flag may be a valued stored in a storage element, such as a register, on the processor 130. At 724, the thermal mitigation module 400 may hot-plug the cores 132-2-132-4. The hot-plug operation may include power-collapsing the cores 132-2-132-4 and notifying the OS so the OS does not try to wake up the power-collapsed cores 132-2-132-4. Power-collapsing the cores 132-2-132-4 reduces the leakage current on the processor 130. At 726, the thermal mitigation module 400 operates to further reduce temperature of the processor 130 by reducing and limiting the operating frequency of the last core 132-1 to 300 megahertz. In one example, the thermal mitigation module 400 may effect the operating frequency limit via the clock controller 414, as presented with FIG. 4. At 728, the thermal mitigation module 400 may provide power to the last core 131-1 at a duty cycle. For example, the thermal mitigation module 400 may effect the power duty cycle via the PS control module 412 as presented with FIG. 4. At 730, the thermal mitigation module 400 notifies the OS scheduler to operate the last core 131-1 at the power duty cycle. In one example, the OS schedule is a component of the HLOS running on the wireless communication device 100. For identification, this state is called state A, and, in one example, the OS may operate from state A.

Figure 8:
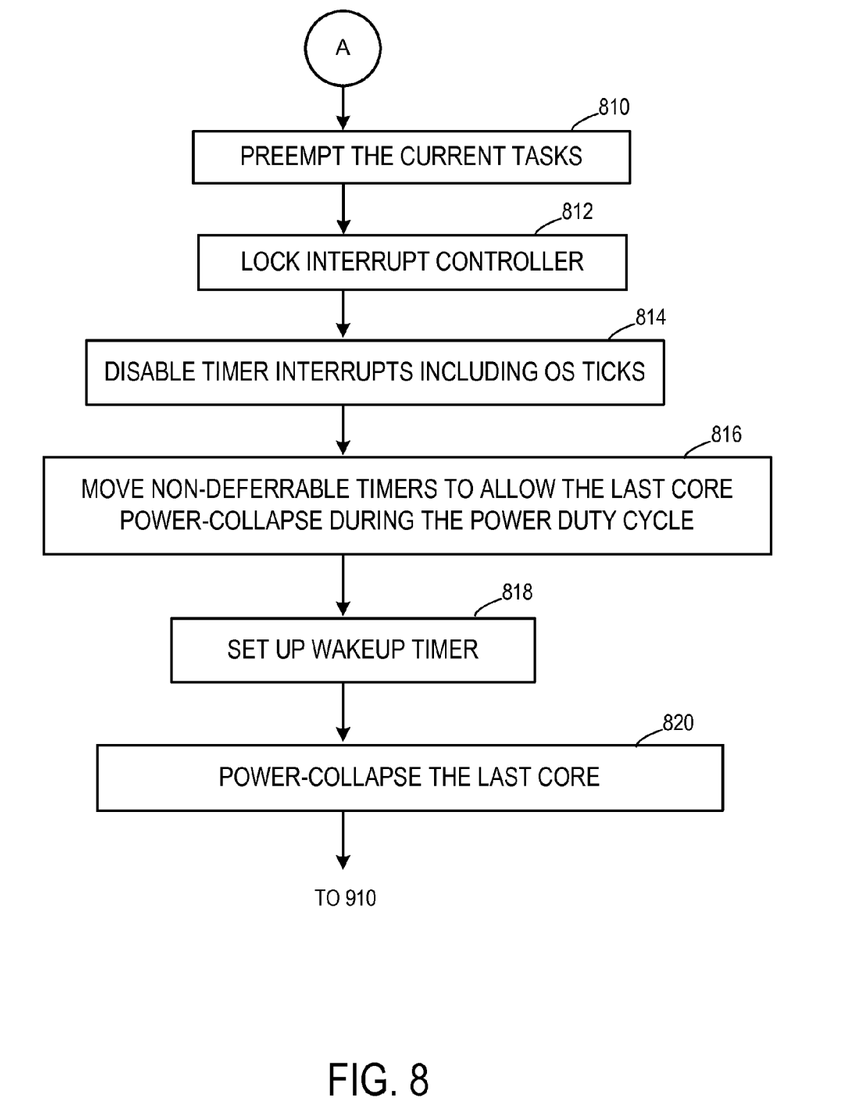
FIG. 8 is a flow diagram illustrating the operation of an exemplary embodiment of an operation system operating on the wireless communication system to provide power to the core at a duty cycle.
Figure 9:
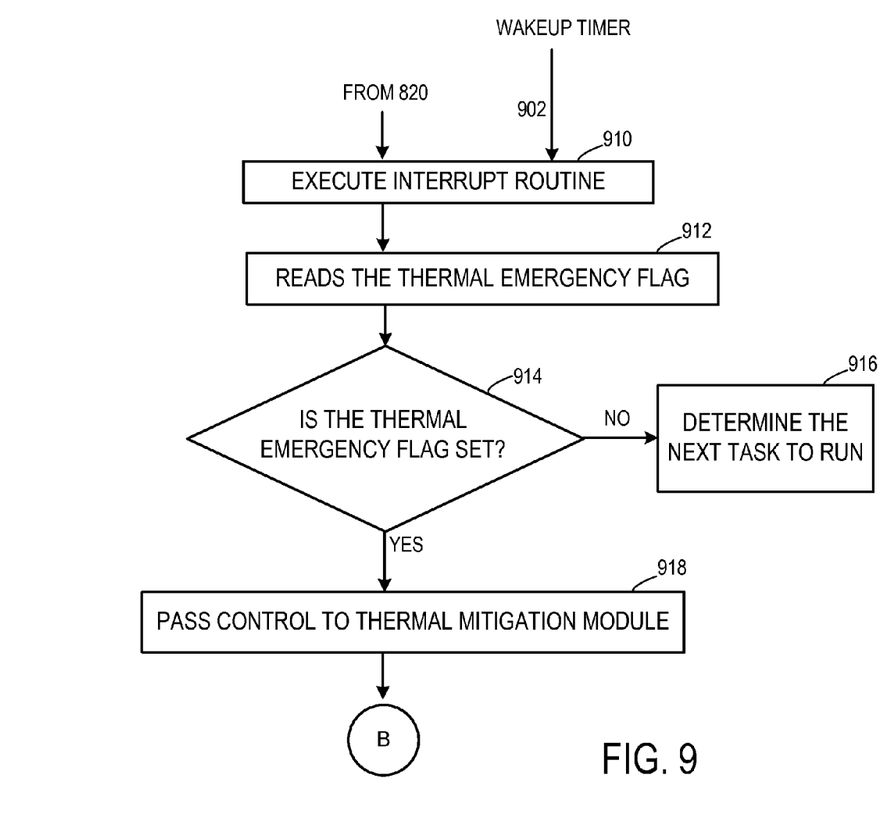
FIG. 9 is a flow diagram illustrating the operation of an exemplary embodiment of an operation system operating on the wireless communication system to provide power to the core at a duty cycle.

FIGS. 8 and 9 are flow diagrams illustrating the operation of an exemplary embodiment of an operation system operating on the wireless communication device 100 to provide power to the core 132-1 at a duty cycle. Referring to FIG. 8, from state A, the OS (e.g., the HLOS scheduler) preempts the current tasks (810). At 812, the OS locks the interrupt controller. In one example, the locked interrupt controller may allow a wakeup j interrupt (presented below) for providing power to the cores at a duty cycle. At 814, the wireless communication device 100 disables timer interrupts including OS ticks. An example of the OS tick is an internal timer for the OS. At 816, the OS moves non-deferrable timers to allow the power-collapsing of the last core 132-1 during the time portion of the duty cycle not providing power to the last core 132-1. In this time portion, all of the cores 132-1-132-4 are in the power-off state. At 818, the OS sets up the wake up timer for the power duty cycle to provide power to the last core 132-1. In one example, the OS may utilize the timer 262 and set the timer 262 for the period of removing power from the last core 132-1 in accordance with power duty cycle. At 820, the OS power-collapses the last core 132-1. In one example, the OS may effect the power-collapse by notifying the thermal mitigation module 400, which in turn may effect the power-collapse of the last core 132-1 via the PS control module 412 as presented with FIG. 4.

Referring to FIG. 9, the OS executes the interrupt routine in response to the interrupt 802 from the wakeup timer (e.g., the timer 262). The OS reads the thermal emergency flag (812) and determines whether the thermal emergency flag is set (814). In a case the thermal emergency flag is not set, the OS may determine what task to run next as there is not thermal emergency (816). In a case that the thermal emergency flag is set, the OS may pass the control to the thermal mitigation module 400 (818). This state is labeled state B for identification.

In the fashion described above, the duty cycle of the power being supplied to the core 132-1 is controlled by the timer 262. The timer 262 receives power from an independent power source (e.g., independent of the power switches 232-1-232-4 and independent of the power source of the cores 132-1-132-4). Moreover, described above, the timer 262 time the duty cycle independent of the temperature sensor output. Thus, although the ratio duty cycle itself may be adjusted based on the temperature sensor output, the timing of the duty cycle (effected by the timer 262) is not.

Figure 10:
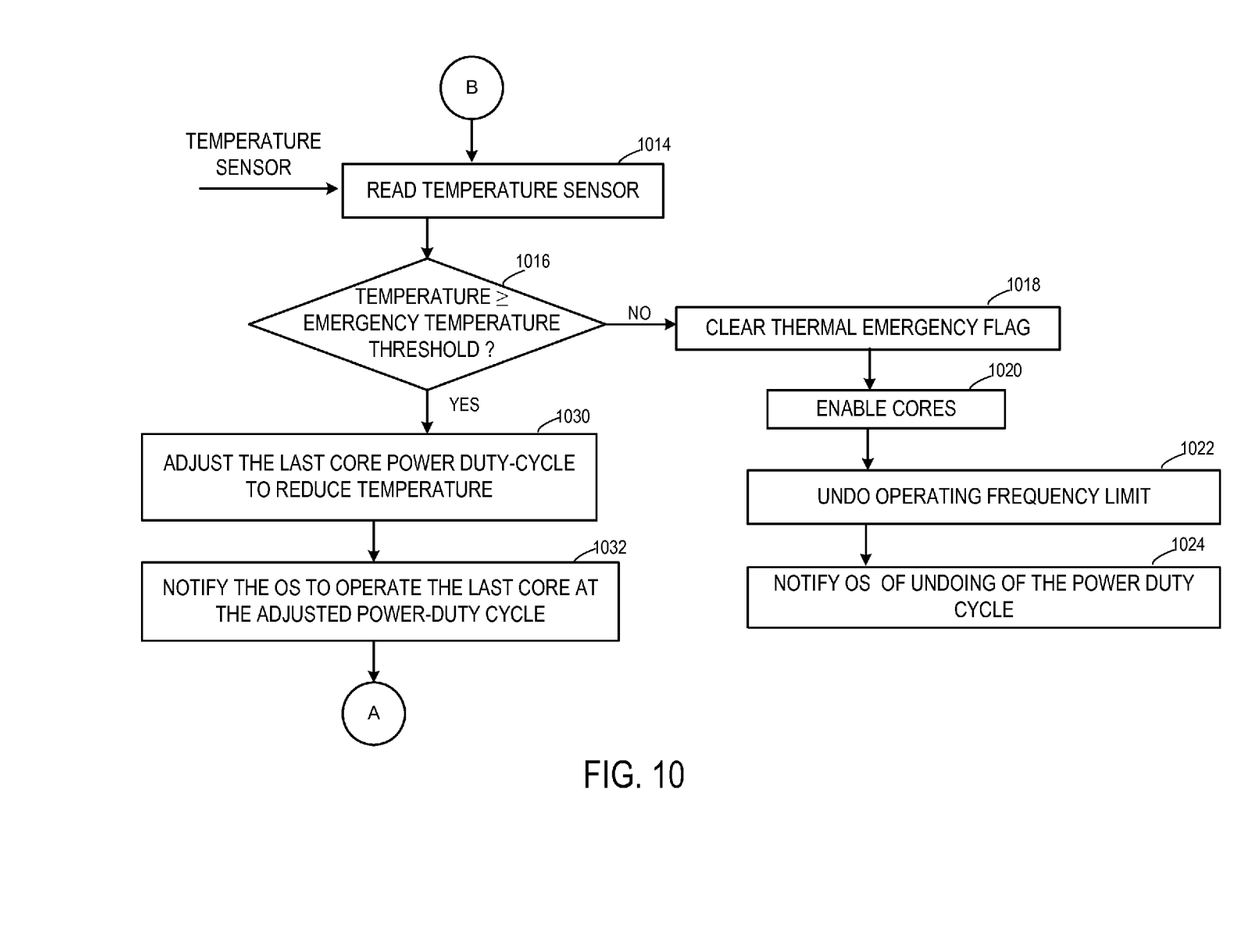
FIG. 10 is a flow diagram illustrating the operation of an exemplary embodiment of a thermal mitigation module exiting the power duty cycle.

FIG. 10 is a flow diagram illustrating the operation of an exemplary embodiment of a thermal mitigation module 400 exiting the power duty cycle. From state B, at 1014, the thermal mitigation module 400 reads the temperature sensor. At 1016, the thermal mitigation module 400 determines if the output of the temperature sensor is greater or equal to the emergency temperature threshold (e.g., 90° C.). If the determination is negative, then at 1018, the thermal mitigation module 400 clears the thermal emergency flag. At 1020, the thermal mitigation module 400 enables all the cores 132-1-132-4. For example, the thermal mitigation module 400 may effect the power switches 232-1-232-4 to provide power to all the cores at 100% power duty cycle (e.g., undo the power duty cycle of the power provided to the last core 132-1). At 1022, the thermal mitigation module 400 may further undo the operating frequency limit. For example, the cores 132-1-132-4 are allowed to operate at a much higher frequency than the 300 megahertz limit. At 1024, the thermal mitigation module 400 notifies the OS of the undoing of the power duty cycle and/or the operating frequency limit.

If the determination of 1016 is affirmative, at 1030, the thermal mitigation module 400 adjusts the power duty cycle of the last core 132-1 to reduce the temperature of the processor 130. The power duty cycle adjustment may be in accordance with the features presented with FIG. 6. The thermal mitigation module 400 may resume providing power to the last core 132-1 and set the timer 262 for the time period to provide power to the last core 131-1 based on the adjust power duty cycle. The thermal mitigation module 400 at 1032 notifies the OS to operate the last core 132-1 at the adjusted power duty cycle. Based on the timer 262 set for the time period to provide power to the last core 131-1, the processor 130 enters state A and returns the control to the OS to remove power from the last core 132-1 to operate at the adjust power duty cycle (e.g., see FIG. 8).

Figure 11:
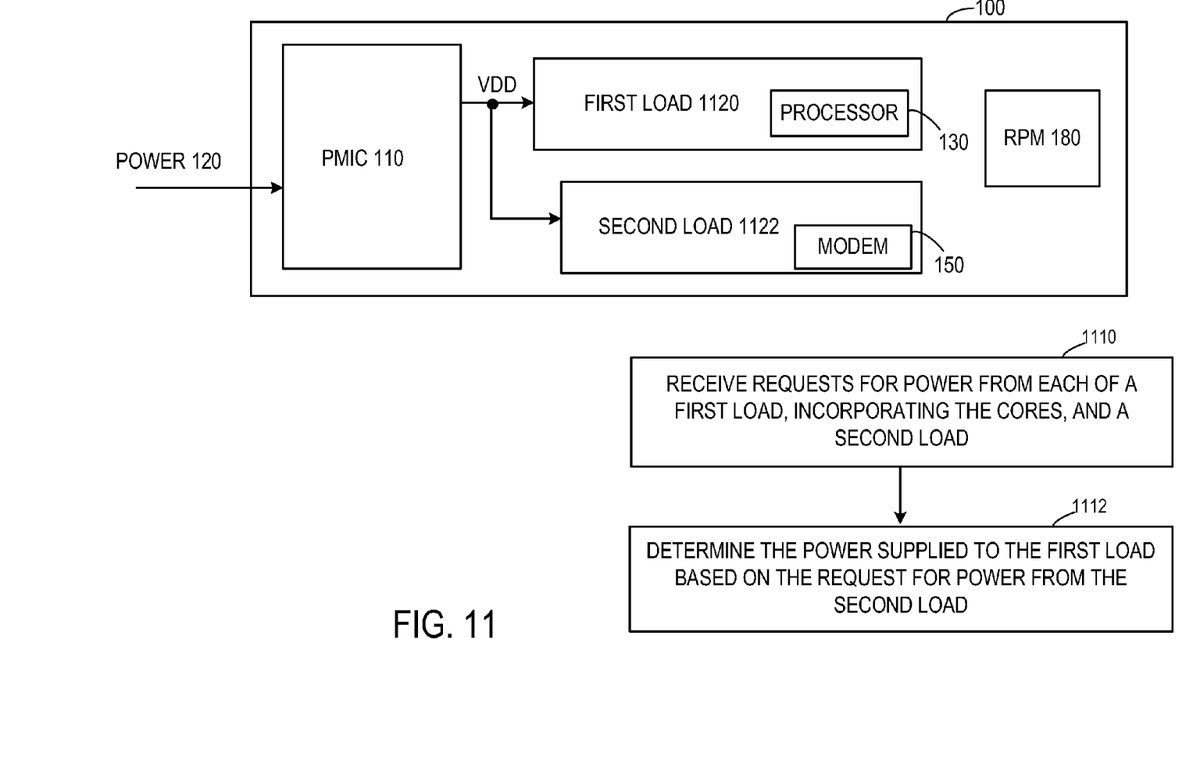
FIG. 11 is a block diagram of an exemplary embodiment of a wireless communication device determining power supplied to a core.

FIG. 11 is a block diagram of an exemplary embodiment of a wireless communication device 100 determining power supplied to a core. Referring to FIG. 1, the PMIC 110 receives power 120 and provides power (e.g., voltage VDD) to a first load 1120 and a second load 1122. In the exemplary embodiment, the first load 1120 may include the processor 130, which in turn includes the cores 132-1-132-4. The second load 1122 may include the modem 150. The wireless communication device 100 further includes the RPM 180 configured to manage the power supplied to the first load 1120 and the second load 1122 (e.g., via the PMIC 110).

Steps 1110 and 1112 provide the operations of the wireless communication device 100 in determining power supplied to a core of the processor 130. These steps may be executed by the RPM 180. The RPM 180 provides a means for receiving requests for power from the first load 1120 and the second load 1122 and determining the power supplied to the first load 1120 and the second load 1122 based on the request for power from the second load 1122.

At 1110, requests for power are received from each of the first load 1120, which incorporates the cores (e.g., 132-1-132-4), and a second load 1122. For example, the RPM 180 receives all the voltage selections from the subsystems on the power rail of the voltage supply VDD. The subsystems include the processor 130 (the first load 1120) and the modem 150 (the second load 1122). In one example, the modem 150 may select a high VDD for performance needs (e.g., operating Long Term Evolution Category 4 with carrier aggregation). At 1112, the power supplied to the first load 1120 is determined based on the request for power from the second load. For example, the RPM 180 may select the request for high VDD from the modem 150 (the second load 1122). Since the modem 150 and the processor 130 both receive the same VDD as power, the processor 130 (the first load 1120) may operate at the same higher VDD as the modem 150 (the second load 1022). Thus, the power supplied to the first load 1120 (e.g., VDD) of the processor 130 may be determined based on the request for power from the second load 1122 (e.g., the modem 150), even if the operations of the processor 130 do not require the level of the voltage VDD. The higher than needed voltage VDD supplied to the processor 130 may lead to a higher leakage current, which in turn increases the temperature. Lowering the operation voltage VDD for thermal mitigation may not be available to the processor 130 because of the shared power rail of the voltage supply VDD.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented. The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. For example, the steps may be implemented by circuits to perform the functions described herein and/or circuits generating the signals for the functions described herein, or combinations thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for.

What is claimed is:

1. An apparatus, comprising:
    a plurality of cores sharing a voltage supply;
    at least one temperature sensor configured to monitor a temperature for the cores;
    a first switch configured to operate at a first duty cycle and supply power from the voltage supply to a first core of the cores;
    a second switch configured to operate at a second duty cycle and supply power from the voltage supply to a second core of the cores; and
    a thermal mitigation module configured to operate at least one of the first switch at a first reduced duty cycle or the second switch at a second reduced duty cycle in response to the monitored temperature exceeding a threshold, the thermal mitigation module further configured to notify an operating system running on the apparatus that the monitored temperature exceeds the threshold, wherein the operating system running on the apparatus is configured to preempt current tasks on at least one of the plurality of cores, set up a wake up timer, and collapse the at least one of the plurality of cores based on being notified that the monitored temperature exceeds the threshold.

2. The apparatus of claim 1, wherein the thermal mitigation module is further configured to power-collapse or hot-plug the second core via the second switch in response to the monitored temperature exceeding the threshold.

3. The apparatus of claim 1, wherein the thermal mitigation module is configured to hot-plug the second core via the second switch in response to the monitored temperature exceeding the threshold.

4. The apparatus of claim 1, wherein the thermal mitigation module is further configured to reduce an operating frequency of the first core in response to the monitored temperature exceeding the threshold.

5. The apparatus of claim 1, further comprising a timer configured to receive power from an independent power source other than the voltage supply, wherein the timer is further configured to control a ratio of the first reduced duty cycle applied by the thermal mitigation module to first switch.

6. The apparatus of claim 5, wherein the timer is further configured to control the ratio of the first reduced duty cycle independent of the monitored temperature.

7. The apparatus of claim 1, further comprising:
    a first load comprising the cores;
    a second load configured to receive power from the voltage supply; and a power management circuit configured to determine the power provided to the first load based on a request for power from the second load.

8. The apparatus of claim 1, wherein the operating system running on the apparatus is further configured to disable timer interrupts and move non-deferrable timers from the at least one of the plurality of cores to another core of the plurality of cores.

9. A method for thermal mitigation for an apparatus, comprising:
monitoring a temperature for a plurality of cores sharing a voltage supply;
supplying power from the voltage supply to a first core of the cores at a duty cycle via a first switch;
supplying power from the voltage supply to a second core of the cores at a second duty cycle via a second switch; and
adjusting the duty cycle of the first switch to a reduced duty cycle in response to the monitored temperature exceeding a threshold, notifying an operating system running on the apparatus that the monitored temperature exceeds the threshold, preempting current tasks on at least one of the plurality of cores, setting up a wake up timer, and collapsing the at least one of the plurality of cores based on being notified that the monitored temperature exceeds the threshold.

10. The method of claim 9, further comprising power-collapsing or hot-plugging the second core in response to the monitored temperature exceeding the threshold.

11. The method of claim 10, wherein the second switch supplies power to all of the cores other than the first core.

12. The method of claim 9, further comprising:
reducing an operating frequency of the first core in response to the monitored temperature exceeding the threshold.

13. The method of claim 9, wherein the adjusting the duty cycle comprises controlling a ratio of the reduced duty cycle independent of the monitored temperature.

14. The method of claim 9, further comprising
receiving requests for power from each of a first load comprising the cores, and a second load; and
determining the power supplied to the first load and the second load from the voltage supply based on the request for power from the second load.

15. An apparatus, comprising:
a plurality of cores sharing a voltage supply;
means for monitoring a temperature for the cores;
means for supplying power from the voltage supply to a first core of the cores at a duty cycle;
means for supplying power from the voltage supply to a second core of the cores at a second duty cycle; and
means for adjusting the duty cycle to a reduced duty cycle in response to the monitored temperature exceeding a threshold, the means for adjusting the duty cycle further configured to notify an operating system running on the apparatus that the monitored temperature exceeds the threshold, wherein the operating system running on the apparatus is configured to preempt current tasks on at least one of the plurality of cores, set up a wake up timer, and collapse the at least one of the plurality of cores based on being notified that the monitored temperature exceeds the threshold.

16. The apparatus of claim 15, wherein the means for supplying power to the second core is configured to power-collapse or hot-plug the second core in response to the monitored temperature exceeding the threshold.

17. The apparatus of claim 16, wherein the means for supplying power to the second core is configured to hot-plug the second core in response to the monitored temperature exceeding the threshold.

18. The apparatus of claim 16, wherein the means for supply power to the second core further supplies power to all of the cores other than the first core.

19. The apparatus of claim 15, further comprising:
means for reducing an operating frequency of the first core in response to the monitored temperature exceeding the threshold.

20. The apparatus of claim 15, further comprising means for controlling a ratio of the reduced duty cycle independent of the monitored temperature.

21. The apparatus of claim 15, further comprising:
a first load comprising the cores;
a second load configured to receive power from the voltage supply;
means for receiving requests for power from the first load and the second load, and determining the power supplied to the first load and the second load based on the request for power from the second load.

* * * * *